United States Patent [19]
Doddapaneni et al.

[11] Patent Number: 5,378,550
[45] Date of Patent: Jan. 3, 1995

[54] ELECTROLYTES FOR POWER SOURCES

[75] Inventors: Narayan Doddapaneni; David Ingersoll, both of Albuquerque, N. Mex.

[73] Assignee: The United States of America as represented by the United States Department of Energy, Washington, D.C.

[21] Appl. No.: 153,416

[22] Filed: Nov. 15, 1993

[51] Int. Cl.[6] .............................. H01M 6/16
[52] U.S. Cl. ...................... 429/13; 429/33; 429/46; 429/192; 429/194; 252/62.2
[58] Field of Search ............... 429/13, 50, 33, 46, 429/188, 192, 194, 197, 198, 190, 27, 206; 252/62.2, 62.3 Q; 204/410, 414, 421

[56] References Cited

U.S. PATENT DOCUMENTS 3,948,681  4/1976  Barger, Jr. et al. ............. 429/46
4,327,166  4/1982  Leger ............................. 429/194
4,622,276  11/1986 Walsh ............................. 429/46
5,237,031  8/1993  Kubota et al. ................... 429/192 X

OTHER PUBLICATIONS

Asada, Manabu, et al., "Conducting Polymer for Capacitor Application: Enhanced Diffusivity of Ions at Cross-Linked Polypyrrole with Multivalent Dopant," Electrochem. Soc. Proceedings, vol. 93-23 (1993) (Month not available).

Primary Examiner—Anthony Skapars
Attorney, Agent, or Firm—Kurt C. Olson; Jeffrey D. Myers

[57] ABSTRACT

Electrolytes for power sources, particularly alkaline and acidic power sources, comprising benzene polysulfonic acids and benzene polyphosphonic acids or salts of such acids.

34 Claims, 7 Drawing Sheets

ELECTROLYTES FOR POWER SOURCES

GOVERNMENT RIGHTS

The U.S. Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to power source electrolytes, particularly alkaline and acidic power source electrolytes.

2. Background Art

Alkaline and acidic power sources are currently employed in myriad consumer applications. Total worldwide sales of these cells/batteries, such as Ni/Cd, Ni/Zn, Ni/Fe, metal/air, Ni/H$_2$, Ag/Zn, Pb/acid and Ni/metal hydrides, exceeds $2 billion annually. Presently, potassium hydroxide is most commonly used as the electrolyte for those alkaline power sources employing aqueous solutions, and sulfuric acid is the electrolyte often used in acidic systems. In aqueous systems, present salts are highly corrosive and, more importantly, are known to undergo electrochemical reactions to produce corrosive products. In addition, both reactants and products are unacceptably soluble in the electrolyte solutions, which can result in dendritic growth during repeated charging and discharging. As a result, such existing power sources fail prematurely. It is important to note that electrolytes are used only to provide ionic conductivity to facilitate ion mobility in cells/batteries to complete the electrical circuit, and are neither expected nor intended to take part in the electrochemical redox process, per se.

The present invention is of novel electrolytes that exhibit many beneficial properties, such as excellent thermal stability, good ionic conductivity, and a wide electrochemical window in aqueous solvent systems, as described more fully below. The physical properties of solutions prepared using these salts are comparable to those of potassium hydroxide solutions and other common supporting electrolyte solutions, but the salts of the present invention do not have the highly corrosive properties of the most common electrolytes used today.

SUMMARY OF THE INVENTION (DISCLOSURE OF THE INVENTION)

The present invention is of a power source and method for providing power comprising: providing a power source requiring an electrolyte and adding to the power source an electrolyte comprising a parent benzene ring with bonds outside the parent benzene ring to R$_1$, R$_2$, R$_3$, R$_4$, R$_5$, and R$_6$, where R$_1$, R$_2$, R$_3$, R$_4$, R$_5$, and R$_6$ each are H, SO$_3$H, SO$_3$X, R'H, R'SO$_3$H, R'SO$_3$X, PO$_3$H, PO$_3$X, R'PO$_3$H, or R'PO$_3$X, where X is a cation and R' is an aliphatic chain, an aromatic ring system, or a combination of an aliphatic chain and an aromatic ring system. Preferably, the electrolyte is a salt of a benzene polysulfonic acid or of a benzene polyphosphonic acid. As non-limiting examples, where R$_1$ is SO$_3$Na, R$_3$ and/or R$_5$ may be SO$_3$Na, or the electrolyte may be a sodium salt of a polystyrene sulfonate, a polyvinyl sulfonate, or naphthalene trisulfonic acid. As another example, where R$_1$ is SO$_3$H, R$_3$ and/or R$_5$ may be SO$_3$H. As further non-limiting examples, where R$_1$ is SO$_3$K, R$_2$ or both R$_3$ and R$_5$ may be SO$_3$K. The power source is preferably selected from the group consisting of aqueous alkaline and alkaline earth batteries, nonaqueous alkaline and alkaline earth batteries, alkaline and alkaline earth batteries employing aqueous and nonaqueous solid or gel electrolytes, batteries and fuel cells employing aqueous acid based electrolytes, and double layer, ultra-, super-, and pseudo-capacitors, including Ni/Cd, Ni/Zn, Ag/Zn, Pb/acid, Ni/Fe, Ni/H$_2$, Ni/metal hydride, and metal/air batteries.

A primary object of the present invention, whether used alpine or in combination with other electrolytes, is to provide electrolytes for power sources which are not highly corrosive, which are not oxidized or reduced to produce corrosive products, which reduce the solubility of the reactants and products, and/or which provide beneficial surface modification of the electrode, resulting in increased cycle life, increased shelf life, less dendritic growth, and increased capacity.

A primary advantage of the present invention, whether used alone or in combination with other electrolytes, is that the electrolytes of the invention provide excellent thermal stability.

Another advantage of the present invention, whether used alone or in combination with other electrolytes, is that the electrolytes of the invention have good ionic conductivity.

An additional advantage of the present invention, whether used alone or in combination with other electrolytes, is that the electrolytes of the invention have a wide electrochemical window in aqueous solvent systems.

Yet another advantage of the present invention, whether used alone or in combination with other electrolytes, is that the cycle life, the utilization efficiency, and/or other performance characteristics of the power supply are improved due to formation of a modified electrode surface and/or altered solubility characteristics of reactants and products.

Other objects, advantages and novel features, and further scope of applicability of the present invention will be set forth in part in the detailed description to follow, when taken in conjunction with the accompanying drawings, will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
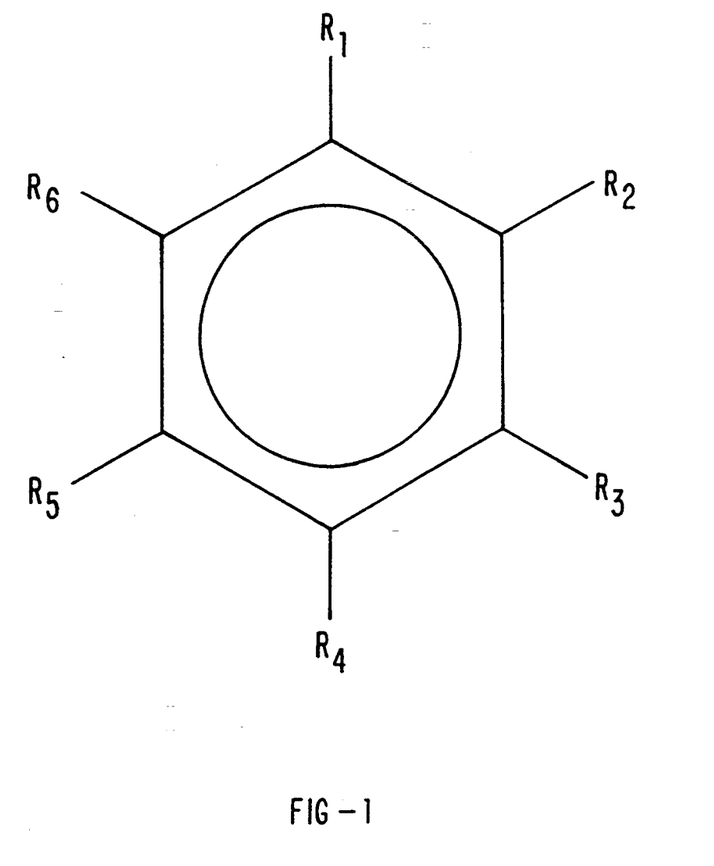
FIG. 1 is a diagram of the electrolytes (salts) of the present invention.

The electrolytes of the present invention are acids and/or their salts such as, preferably, benzene polysulfonic acids and benzene polyphosphonic acids of the type shown in FIG. 1 where $R_1$, $R_2$, $R_3$, $R_4$, $R_5$, and $R_6$ each are H, $SO_3H$, $SO_3X$, $R'H$, $R'SO_3H$, $R'SO_3X$, $PO_3H$, $PO_3X$, $R'PO_3H$, or $R'PO_3X$, where X is a cation (such as an alkali or alkaline earth ion) and R' is an aliphatic chain or aromatic ring system that may or may not be fused to the parent benzene ring structure.

Figure 2:
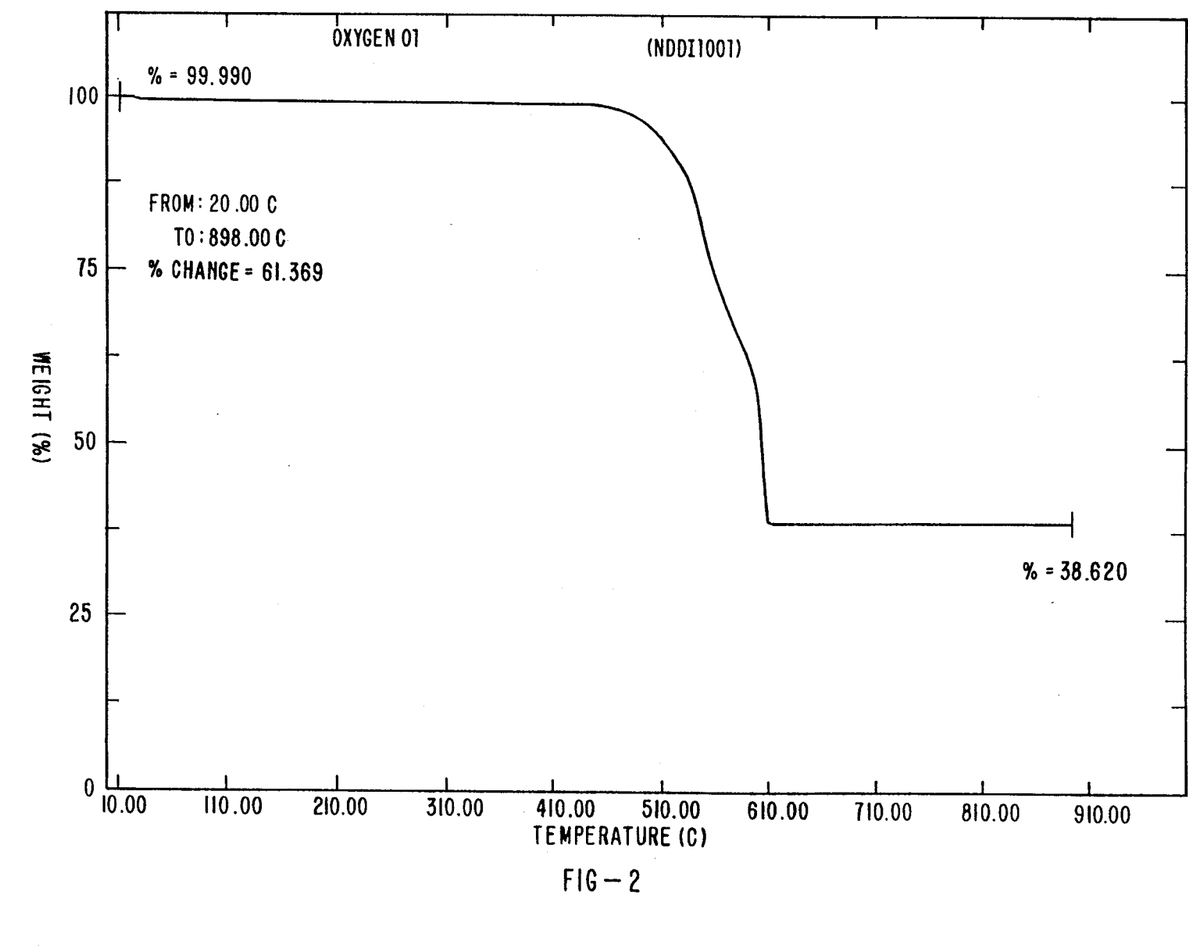
FIG. 2 is a graph of thermal gravimetric analysis data for a salt of the present invention where R$_1$ is SO$_3$Na and R$_2$, R$_3$, R$_4$, R$_5$, and R$_6$ are H.
Figure 3:
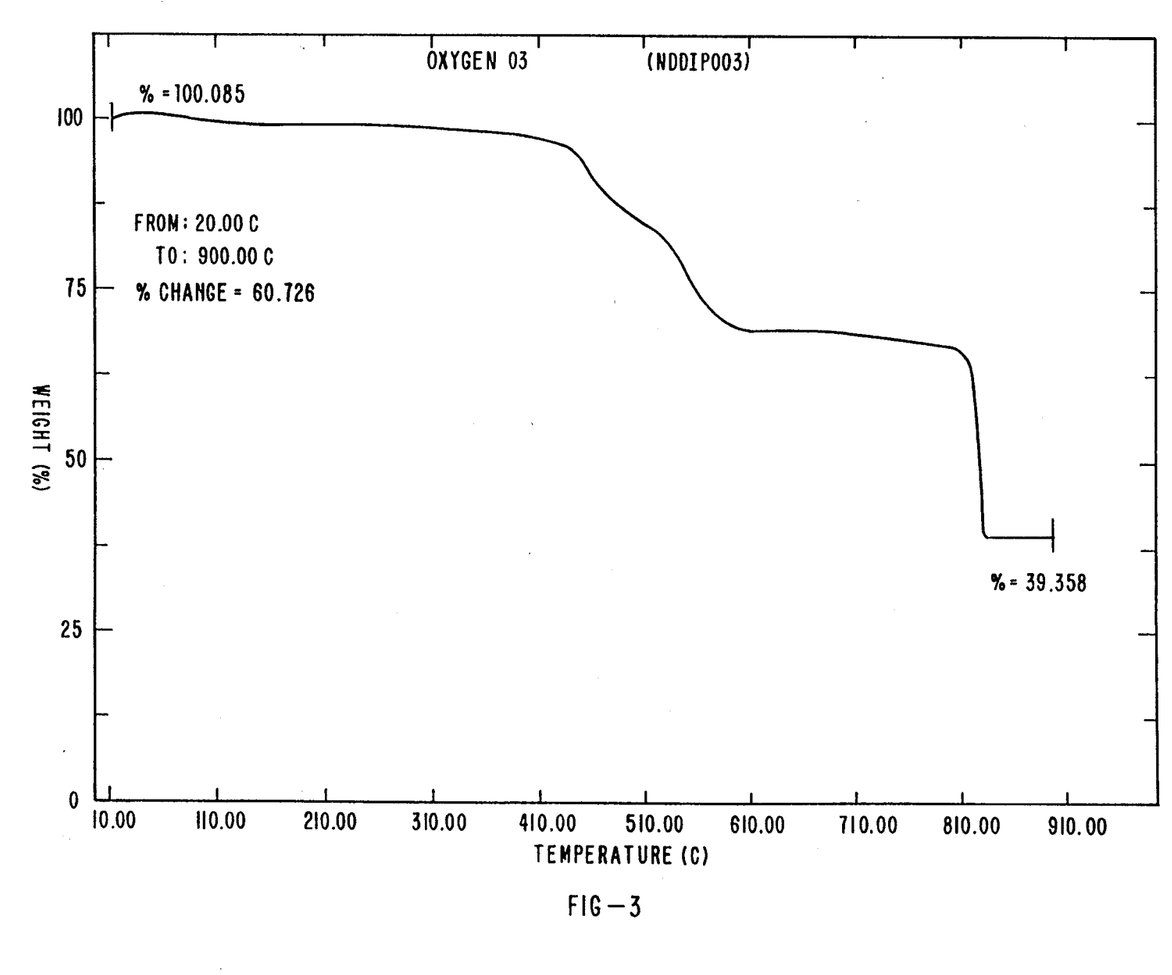
FIG. 3 is a graph of thermal gravimetric analysis data for a salt of the present invention where R$_1$ is SO$_3$Na, R$_2$, R$_3$, R$_5$, and R$_6$ are H, and R$_4$ is (CH$_2$—CH$_2$—C$_6$H$_3$SO$_3$Na)$_x$.
Figure 4:
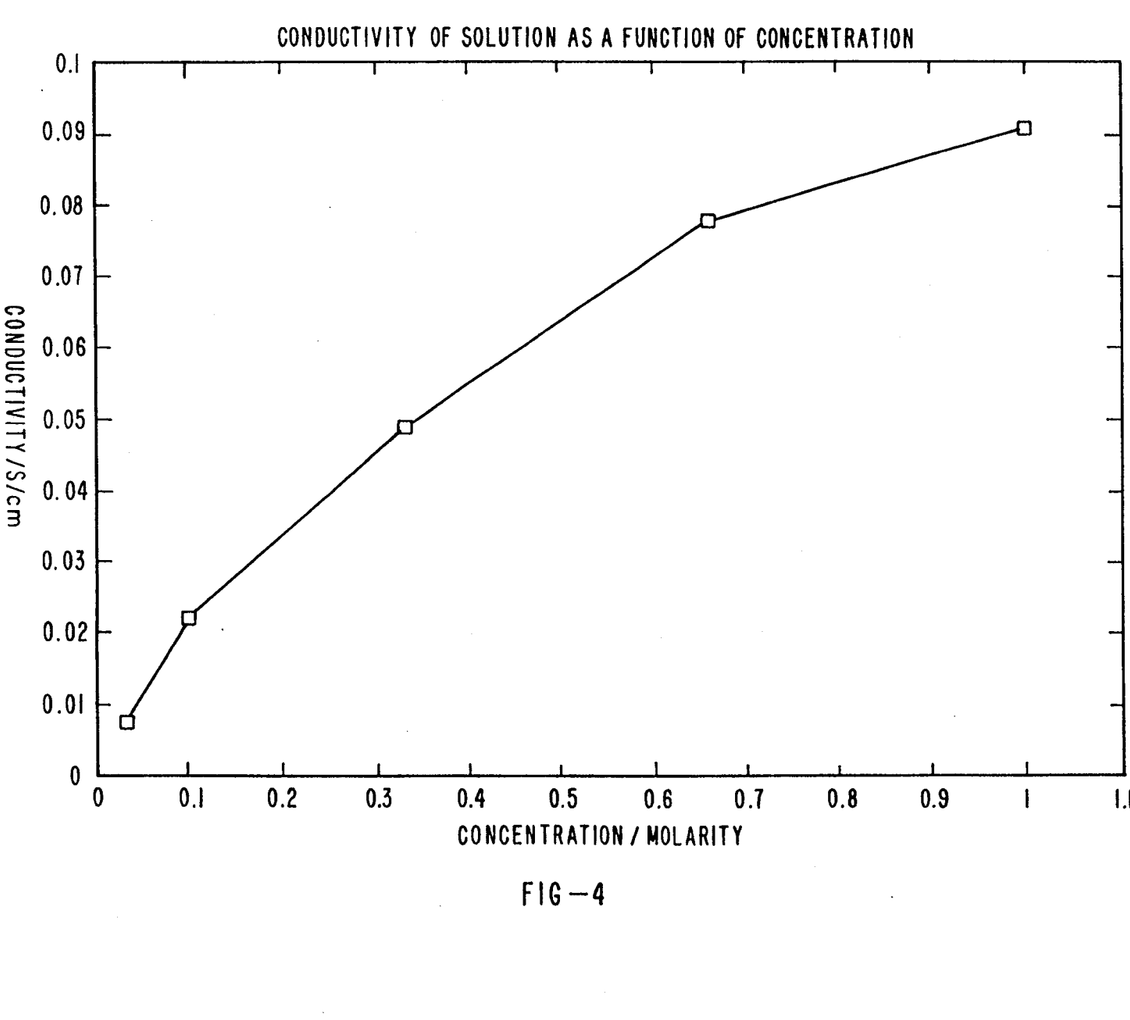
FIG. 4 is a graph of average conductivity of solutions of salts of the present invention as a function of concentration.

The electrolytes of the present invention exhibit many useful characteristics. They display a high degree of thermal stability, and can be heated to well over 400° C. before showing signs of decomposition, even in an oxygen atmosphere. This is readily seen upon examination of the thermal gravimetric analysis data shown in FIGS. 2 and 3. The ionic conductivity of aqueous solutions of the salts of the invention, an important characteristic in electrochemical power systems, is comparable to that of the more commonly used supporting electrolyte solutions, such as $H_2SO_4$ and KOH. This is seen by examination of the data contained in Tables 1 and 2 and FIG. 4. The pH of aqueous solutions of the new salts is slightly basic, as seen by the data shown in Table 3.

The density of aqueous solutions of the salts of the invention is slightly greater than one, and compares favorably with other common salt solutions, as seen by the data contained in Table 4. As is to be expected, the freezing point of aqueous solutions of the salts of the invention is slightly depressed, and so they facilitate low temperature operation of cells/batteries. Comparative freezing point data for aqueous solutions of various salts is shown in Table 5.

Figure 5:
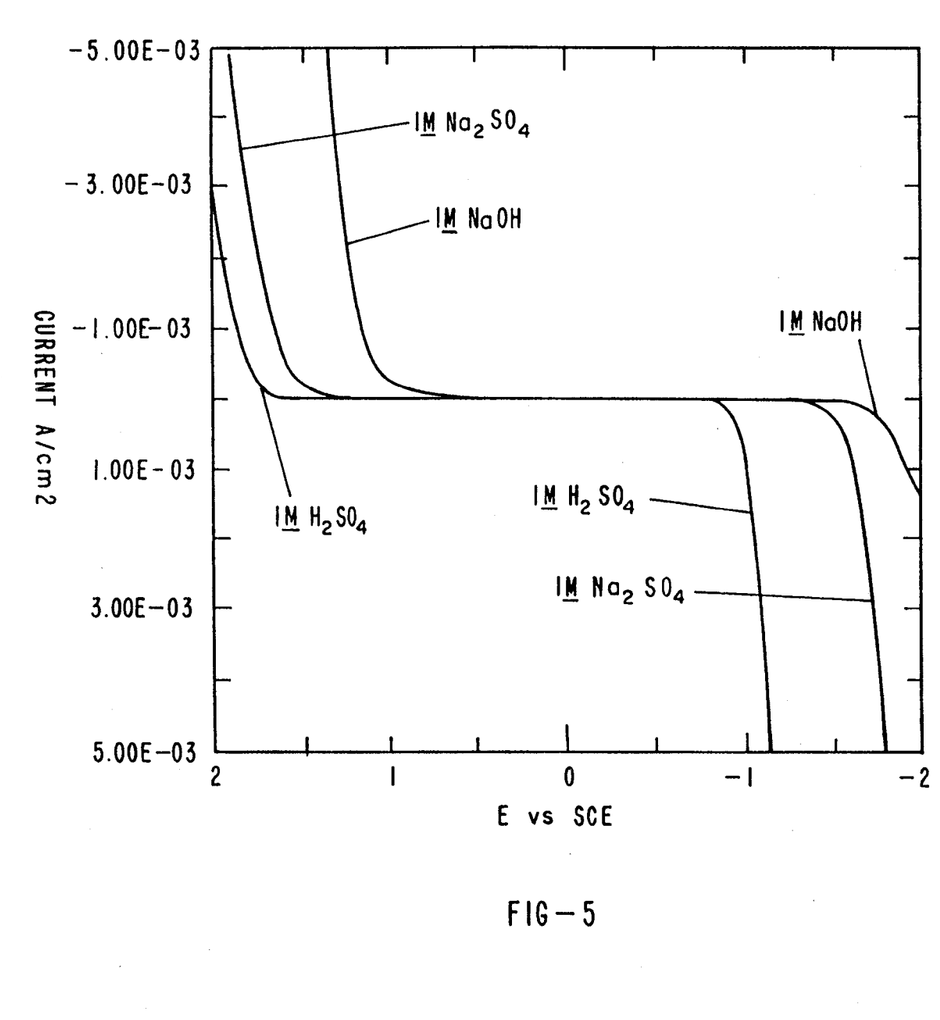
FIG. 5 is a graph of polarization curves for a salt of the present invention where $R_1$, $R_3$, and $R_5$ are $SO_3K$ and $R_2$, $R_4$, and $R_6$ are H.
Figure 6:
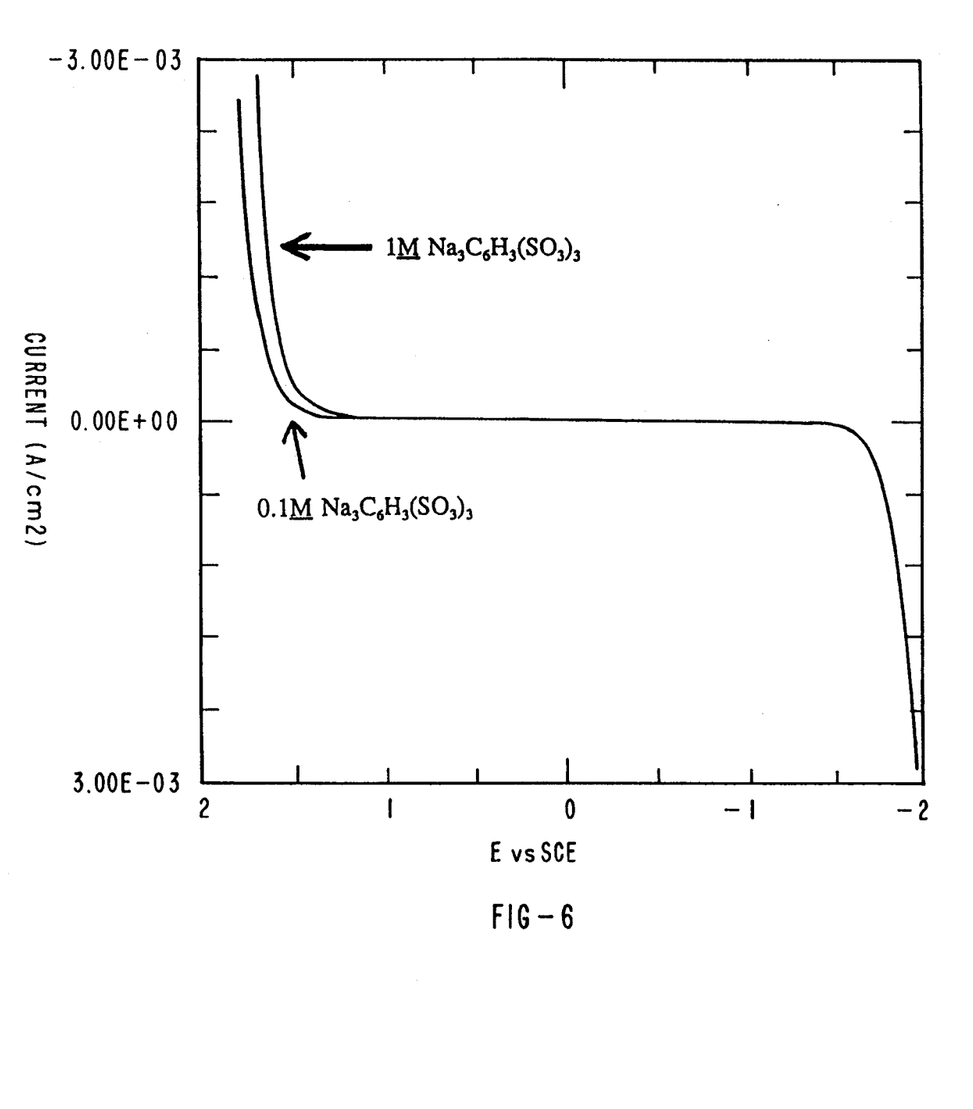
FIG. 6 is a graph of polarization curves for prior art electrolytes.

The electrochemical working range of aqueous solutions of the acids and salts of the invention is larger than the ranges observed for other, commonly used salts (and can be as large as 3 V in an aqueous system). Furthermore, the electrochemical process occurring at the potential limits corresponds to decomposition of the solvent, and not of the salts of the invention. This is graphically illustrated in FIGS. 5 and 6, which compare the polarization curves of aqueous solutions of one of the subject salts and other common supporting electrolytes, such as KOH, $H_2SO_4$, and $Na_2SO_4$.

Figure 7A:
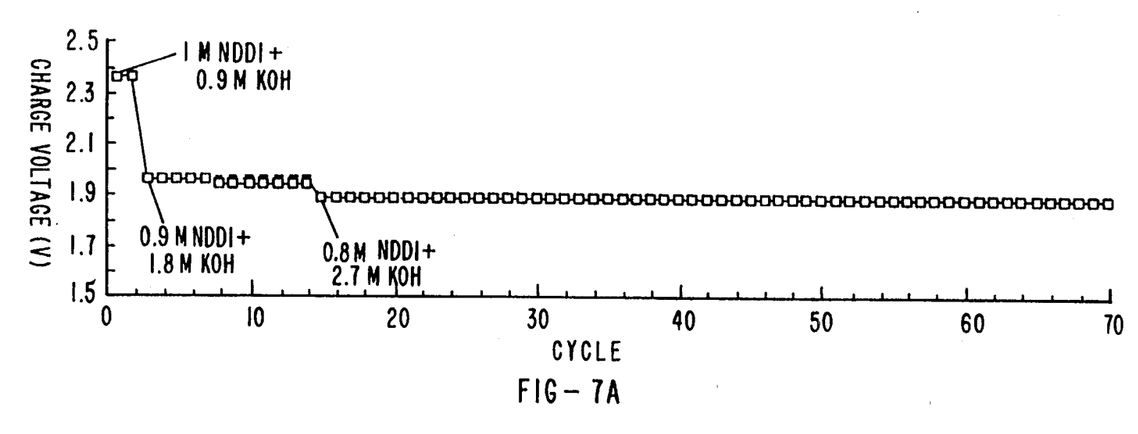
FIG. 7 is a graph of performance data for a Ni/Zn cell at varying relative concentrations of potassium hydroxide and potassium 1,3,5-benzenetrisulfonate.
Figure 7B:
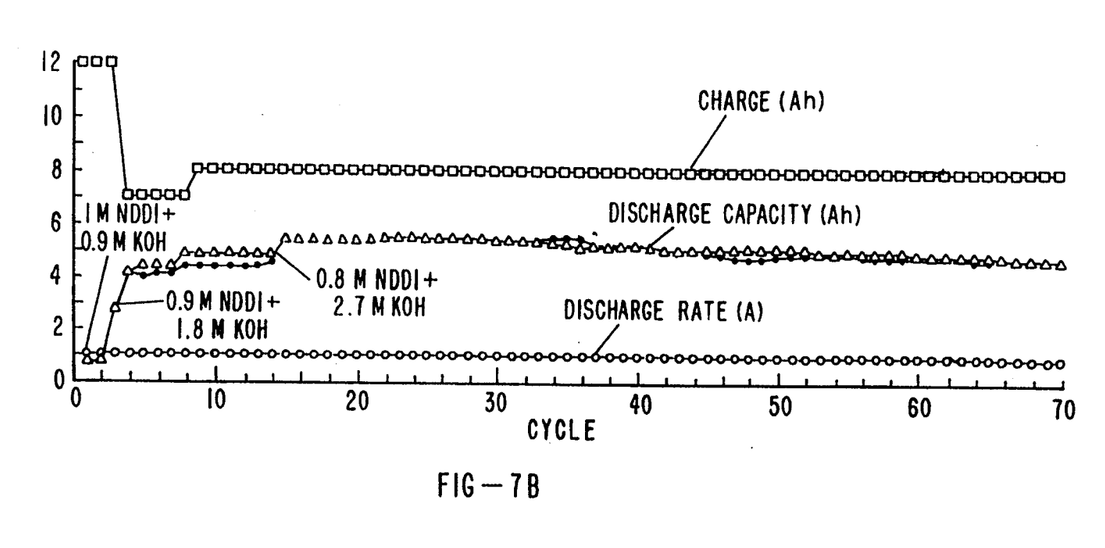

FIG. 7 shows performance data for a Ni/Zn cell at varying relative concentrations of potassium hydroxide and sodium 1,3,5-benzenetrisulfonate. Note that as the alkalinity is increased by increasing the relative concentration of potassium hydroxide, the discharge capacity is seen to increase. At relative concentrations of 2.7:0.8 (KOH:sulfonate salt), the capacity is 345 mAh/g of ZnO, approximately twice that observed when the sulfonate salt is not present. In addition, the capacity or charge and discharge is relatively constant, even after the 70 deep charge/deep discharge cycles recorded. Also, the cycle-to-cycle efficiency is seen to be close to unity in this system, and the voltage remains fixed.

The electrolytes of the present invention can be used in many electrochemical power systems, including, but not limited to: 1) aqueous alkaline and alkaline earth systems; 2) alkaline and alkaline earth systems employing aqueous solid electrolytes, including gels; 3) acid based power supplies such as Pb/acid batteries; and 4) double layer, ultra-, super-, pseudo-, etc., capacitors. This includes both primary and secondary systems. Some of these systems include: Ni/Cd, Ni/Zn, Ag/Zn, Pb/acid, Ni/Fe, $Ni/H_2$, Ni/metal hydride, and metal-/air batteries, and other alkaline metal batteries, as well as replacement of aqueous carbonate electrolytes in fuel cells.

Fuel cells and alkaline batteries/cells generally employ aqueous solutions of alkali metal carbonates and hydroxides and acids such as phosphoric and sulfuric acids. Solutions making use of the electrolytes described herein can be employed in these electrochemical devices, either in place of the conventional electrolytes, or in combination with them. The resultant solutions utilizing the salts of the invention are less reactive with the cell components, and hence allow for an increased shelf life and enhanced performance.

Cells/batteries employing solid electrolytes, such as proton exchange membrane fuel cells, often use an acid dissolved in/attached to a polymer. The use of the acids disclosed herein (such as an acid of the invention where $R_1$, $R_3$, and $R_5$ are $SO_3H$ and $R_2$, $R_4$, and $R_6$ are H) in place of those presently being used provides a larger working voltage window and enhanced performance. This results from the fact that the acids of the invention are not electrochemically or chemically decomposed within the voltage range or the conditions presently employed. Salts, including those of the invention, may also be used in solid electrolyte applications.

When an electrolyte of the invention is used with 10% to 30% potassium hydroxide in place of 20–45% potassium hydroxide solutions in systems such as Zn/air, Zn/Ni, etc., the electrochemical performance is superior to that observed with potassium hydroxide solutions. The superior performance, particularly in capcity, cycle life, and self-discharge rate characteristics, is likely due to less corrosion of the new electrolytes, reduced solubility characteristics of the reactants and/or products of the cell, and/or surface modification of the electrode.

TABLE 1

| COMPARATIVE CONDUCTIVITY DATA | | | |
|---|---|---|---|
| Solution | Resistance (Ω) | Conductivity (S/cm) | Percent Error |
| Calibration Standards | | | |
| $1.33 \times 10^4 \Omega$ | $1.36 \times 10^4$ | $7.51 \times 10^{-5}$ | 2.2% |
| $1.39 \times 10^3 \Omega$ | $1.38 \times 10^3$ | $7.25 \times 10^{-4}$ | 0.7% |
| $1.50 \times 10^2 \Omega$ | $1.47 \times 10^2$ | $6.80 \times 10^{-3}$ | 2.0% |
| $17.05 \Omega$ | 16.9 | $5.92 \times 10^{-2}$ | 0.8% |
| 0.1M Salt Solutions | | | |
| KOH | 48.9 | 0.024 | — |
| $H_2SO_4$ | 22.8 | 0.044 | — |
| NaCl | 96.1 | 0.010 | — |
| $Na_2SO_4$ | 63.1 | 0.016 | — |
| NDDI | 44.6 | 0.022 | — |
| 1.0M Salt Solutions | | | |
| KOH | 5.84 | 0.171 | — |
| $H_2SO_4$ | 2.82 | 0.355 | — |
| $Na_2SO_4$ | 11.4 | 0.087 | — |

TABLE 1-continued
COMPARATIVE CONDUCTIVITY DATA

| Solution | Resistance (Ω) | Conductivity (S/cm) | Percent Error |
|---|---|---|---|
| NDDI | 11.0 | 0.091 | — |
| NDDI Solutions | | | |
| 0.033M NDDI | 133 | 0.00752 | — |
| 0.1M NDDI | 44.6 | 0.022 | — |
| 0.33M NDDI | 20.3 | 0.049 | — |
| 0.66M NDDI | 12.8 | 0.078 | — |
| 1M NDDI | 11.0 | 0.091 | — |

Note: NDDI is a salt of the invention where $R_1$, $R_3$, and $R_5$ are $SO_3Na$ and $R_2$, $R_4$, and $R_6$ are H.

TABLE 2
COMPARATIVE CONDUCTIVITY DATA OF NEW SALT ANALOGUES

| Solution | Resistance (Ω) | Conductivity (S/cm) | Percent Error |
|---|---|---|---|
| Standards | | | |
| $1.50 \times 10^2 \Omega$ | $1.53 \times 10^2$ | $6.54 \times 10^{-3}$ | 1.9% |
| 17.05Ω | 17.3 | $5.78 \times 10^{-2}$ | 1.4% |
| 0.1M Salt Solutions | | | |
| NDDI-M | 68.0 | 0.0147 | |
| NDDI-O | 73.6 | 0.0136 | |
| NDDI-1 | 153 | 0.00654 | |
| NDDI-N3 | 51.8 | 0.0193 | |
| POLY-NDDI | 192 | 0.00521 | |
| 0.5M Salt Solutions | | | |
| NDDI-O | 21.2 | 0.0472 | |
| NDDI-N3 | 15.8 | 0.0633 | |
| 1.0M Salt Solutions | | | |
| NDDI-M | 12.5 | 0.08 | |
| NDDI-1 | 23.0 | 0.0435 | |
| POLY-VNDDI | 20.9 | 0.0478 | |

Note: NDDI-M is a salt of the invention where $R_1$ and $R_3$ are $SO_3Na$ and $R_2$, $R_4$, $R_5$ and $R_6$ are H. For NDDI-O, $R_1$ and $R_2$ are $SO_3K$ and $R_3$, $R_4$, $R_5$, and $R_6$ are H. For NDDI-1, $R_1$ is $SO_3Na$ and $R_2$, $R_3$, $R_4$, $R_5$, and $R_6$ are H. NDDI-N is a sodium salt of napthalene trisulfonic acid. POLY-NDDI is a sodium salt of polystyrene sulfonate. POLY-VNNDI is a sodium salt of polyvinyl sulfonate.

TABLE 3
pH OF VARIOUS SALT SOLUTIONS

| Solution | pH |
|---|---|
| NDDI | |
| 0.033M | 7.92 |
| 0.1M | 8.35 |
| 0.33M | 9.12 |
| 0.66M | 9.11 |
| 1.0M | 8.92 |
| $H_2SO_4$ | |
| 0.1M | 0.99 |
| 1.0M | 0.01 |
| KOH | |
| 0.1M | 12.84 |
| 1.0M | 13.82 |

Note: NDDI is a salt of the invention where $R_1$, $R_3$ and $R_5$ are $SO_3K$ and $R_2$, $R_4$ and $R_6$ are H.

TABLE 4
DENSITY OF VARIOUS SALT SOLUTIONS

| Solution | Density (g/cm³) |
|---|---|
| NDDI | |
| 0.033M | 0.999 |
| 0.1M | 1.018 |
| 0.33M | 1.063 |
| 0.66M | 1.134 |
| 1.0M | 1.179 |
| NaCl | |
| 0.1M | 0.997 |
| $Na_2SO_4$ | |
| 0.1M | 1.004 |
| 1.0M | 1.110 |
| $H_2SO_4$ | |
| 0.1M | 0.997 |
| 1.0M | 1.051 |
| KOH | |
| 0.1M | 0.99 |
| 1.0M | 1.033 |

Note: NDDI is a salt of the invention where $R_1$, $R_3$ and $R_5$ are $SO_3K$ and $R_2$, $R_4$ and $R_6$ are H.

TABLE 5
FREEZING POINT OF VARIOUS SALT SOLUTIONS

| Solution | Temperature (°C) |
|---|---|
| NDDI | |
| 0.033M | −10° C. |
| 0.1M | −8° C. |
| 0.33M | −17° C. |
| 0.66M | −17° C. |
| 1.0M | −17° C. |
| NaCl | |
| 0.1M | −10° C. |
| $Na_2SO_4$ | |
| 0.1M | −8° C. |
| 1.0M | −10° C. |
| $H_2SO_4$ | |
| 0.1M | −5° C. |
| 1.0M | −10° C. |
| KOH | |
| 0.1M | −5° C. |
| 1.0M | −14° C. |

Note: NDDI is a salt of the invention where $R_1$, $R_3$ and $R_5$ are $SO_3K$ and $R_2$, $R_4$ and $R_6$ are H.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A power source comprising an electrolyte comprising a parent benzene ring with bonds outside said parent benzene ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3H$, $SO_3X$, R'H, $R'SO_3H$, $R'SO_3X$, $PO_3H$, $PO_3X$, $R'PO_3H$, and $R'PO_3X$, where X comprises a cation and R' comprises an aliphatic chain, an aromatic ring system, or a combination of an aliphatic chain and an aromatic ring system.

2. The invention of claim 1 wherein said electrolyte comprises a benzene polysulfonic acid or a salt thereof.

3. The invention of claim 1 wherein said electrolyte comprises a benzene polyphosphonic acid or a salt thereof.

4. The invention of claim 1 where $R_1$ is $SO_3Na$.

5. The invention of claim 4 where $R_3$ is $SO_3Na$.

6. The invention of claim 5 where $R_5$ is $SO_3Na$.

7. The invention of claim 4 wherein said electrolyte comprises a sodium salt of a polystyrene sulfonate.

8. The invention of claim 4 wherein said electrolyte comprises a sodium salt of a polyvinyl sulfonate.

9. The invention of claim 4 wherein said electrolyte comprises a sodium salt of napthalene trisulfonic acid.

10. The invention of claim 1 where $R_1$ is $SO_3H$.

11. The invention of claim 10 where $R_3$ is $SO_3H$.

12. The invention of claim 11 where $R_5$ is $SO_3H$.

13. The invention of claim 1 where $R_1$ is $SO_3K$.

14. The invention of claim 13 where $R_2$ is $SO_3K$.

15. The invention of claim 13 where $R_3$ and $R_5$ are $SO_3K$.

16. The invention of claim 1 wherein said power source comprises a member selected from the group consisting of aqueous alkaline and alkaline earth batteries, nonaqueous alkaline and alkaline earth batteries, alkaline and alkaline earth batteries employing aqueous and nonaqueous solid or gel electrolytes, batteries and fuel cells employing aqueous acid based electrolytes, and double layer, ultra-, super-, and pseudo-capacitors.

17. The invention of claim 16 wherein said power source comprises a member selected from the group consisting of Ni/Cd, Ni/Zn, Ag/Zn, Ni/Fe, Ni/H$_2$, Ni/metal hydride, metal/air, and Pb/acid batteries.

18. A method for providing power, the method comprising the steps of:
   a) providing a power source requiring an electrolyte; and
   b) adding to the power source an electrolyte comprising a parent benzene ring with bonds outside the parent benzene ring to $R_1$, $R_2$, $R_3$, $R_4$, $R_5$, and $R_6$, where $R_1$, $R_2$, $R_3$, $R_4$, $R_5$, and $R_6$ each comprise a member selected from the group consisting of H, $SO_3H$, $SO_3X$, R'H, $R'SO_3H$, $R'SO_3X$, $PO_3H$, $PO_3X$, $R'PO_3H$, and $R'PO_3X$, where X comprises a cation and R' comprises an aliphatic chain, an aromatic ring system, or a combination of an aliphatic chain and an aromatic ring system.

19. The invention of claim 18 wherein the adding step comprises adding a benzene polysulfonic acid or a salt thereof.

20. The invention of claim 18 wherein the adding step comprises adding a benzene polyphosphonic acid or a salt thereof.

21. The invention of claim 18 where $R_1$ is $SO_3Na$.

22. The invention of claim 21 where $R_3$ is $SO_3Na$.

23. The invention of claim 22 where $R_5$ is $SO_3Na$.

24. The invention of claim 21 wherein the adding step comprises adding a sodium salt of a polystyrene sulfonate.

25. The invention of claim 21 wherein the adding step comprises adding a sodium salt of a polyvinyl sulfonate.

26. The invention of claim 21 wherein the adding step comprises adding a sodium salt of napthalene trisulfonic acid.

27. The invention of claim 18 where $R_1$ is $SO_3H$.

28. The invention of claim 27 where $R_3$ is $SO_3H$.

29. The invention of claim 28 where $R_5$ is $SO_3H$.

30. The invention of claim 18 where $R_1$ is $SO_3K$.

31. The invention of claim 30 where $R_2$ is $SO_3K$.

32. The invention of claim 30 where $R_3$ and $R_5$ are $SO_3K$.

33. The invention of claim 18 wherein the providing step comprises providing a power source selected from the group consisting of aqueous alkaline and alkaline earth batteries, nonaqueous alkaline and alkaline earth batteries, alkaline and alkaline earth batteries employing aqueous and nonaqueous solid or gel electrolytes, batteries and fuel cells employing aqueous acid based electrolytes, and double layer, ultra-, super-, and pseudo-capacitors.

34. The invention of claim 33 wherein the providing step comprises providing a power source selected from the group consisting of Ni/Cd, Ni/Zn, Ag/Zn, Ni/Fe, Ni/H$_2$, Ni/metal hydride, metal/air, and Pb/acid batteries.

* * * * *